United States Patent [19]

Brandener

[11] Patent Number: 4,955,218

[45] Date of Patent: Sep. 11, 1990

[54] METHOD OF MANUFACTURING A HIGH TEMPERATURE COMPOSITE GASKET INCLUDING A STRIP SEGMENT OF NON-WOVEN FIBROUS REFRACTORY MATERIAL

[75] Inventor: Louis Brandener, Poissy, France

[73] Assignee: Jacques Dubois, Barentin, France

[21] Appl. No.: 55,557

[22] Filed: May 27, 1987

[30] Foreign Application Priority Data

Jun. 2, 1986 [FR] France ................... 86 07878

[51] Int. Cl.⁵ .................. B29C 53/56; B32B 31/06; F16J 15/12
[52] U.S. Cl. ........................... 72/146; 29/505; 264/257; 264/324; 277/230; 277/235 R; 277/DIG. 6; 285/267; 285/368; 285/412; 285/910; 428/253
[58] Field of Search .............. 264/258, 257, 324, 501, 264/512, 103; 277/230, 235 R, DIG. 6, 101, 229; 428/251, 253, 256, 281, 285, 408, 132, 137; 285/412, 368, 910, 267; 29/527.1, 428, 505; 72/46, 137, 146; 140/71 C

[56] References Cited

U.S. PATENT DOCUMENTS

| | | | |
|---|---|---|---|
| 1,161,213 | 11/1915 | Headson | 277/230 X |
| 3,206,229 | 9/1965 | Kramer | 277/230 X |
| 4,417,733 | 11/1983 | Usher | 264/324 X |
| 4,443,517 | 4/1984 | Shah | 428/285 X |
| 4,454,190 | 6/1984 | Katagiri | 428/281 |
| 4,462,603 | 7/1984 | Usher et al. | 277/230 |
| 4,601,476 | 7/1986 | Usher et al. | 277/230 |
| 4,607,851 | 8/1986 | Usher | 264/258 X |
| 4,659,091 | 4/1987 | Baasner | 277/235 R X |

FOREIGN PATENT DOCUMENTS

| | | |
|---|---|---|
| 1526557 | 4/1970 | Fed. Rep. of Germany . |
| 2912347 | 10/1980 | Fed. Rep. of Germany . |
| 3042226 | 7/1982 | Fed. Rep. of Germany . |
| 173662 | 10/1982 | Japan ................... 277/230 |

*Primary Examiner*—Allan N. Shoap
*Attorney, Agent, or Firm*—Sixbey, Friedman, Leedom & Ferguson

[57] ABSTRACT

The method in accordance with the invention comprises the steps of forming a strip of composite material comprising at least one flexible strip of refractory material superposed on at least one strip of knitted metal, of making a blank by winding the strip of composite material into a loop comprising at least one turn, and in compressing the loop in the axial direction thereof, the method is characterized in that the flexible strip of refractory material includes at least one strip segment (3) of non-woven fibers occupying at least one turn of the winding, and at least one segment of non-fibrous refractory material (2, 4) forming at least one turn of the loop. The resulting gasket comprises knitted metal having a refractory material held captive therein, which material comprises, in cross section, a fibrous portion surrounded at least partially by a non-fibrous portion.

5 Claims, 2 Drawing Sheets

METHOD OF MANUFACTURING A HIGH TEMPERATURE COMPOSITE GASKET INCLUDING A STRIP SEGMENT OF NON-WOVEN FIBROUS REFRACTORY MATERIAL

The present invention relates to a method of manufacturing a high temperature composite gasket and to a gasket produced thereby. A gasket in accordance with the invention is particularly, but not exclusively, applicable to a flexible exhaust joint for transversely-mounted engines.

When a car is being assembled, and more particularly when a car having a transversely-mounted engine is being assembled, it is known that it is necessary to provide a flexible joint between the exhaust manifold which is fixed to the engine and the exhaust pipe which is fixed to the bodywork and which supports the muffler. In order to absorb relative movements between the manifold and the exhaust pipe, and in order to provide sealing, this joint generally includes a gasket having a spherical bearing surface which co-operates with a complementary surface of the manifold or of the exhaust pipe. The flanges for connecting the exhaust manifold to the exhaust pipe also include a set of springs for keeping the assembled parts pressed against the gasket in order to seal the connection between the exhaust manifold and the muffler. Such sealing is particularly important in exhaust systems which include a catalytic muffler. Such systems generally also include a probe at the muffler for determining the composition of the gases entering the catalytic muffler. If proper sealing is not provided by the gasket between the exhaust manifold and the exhaust pipe, air enters past the gasket and the analysis performed by the probe gives rise to more fuel being fed to the engine. As a result there is a considerable risk of unburned fuel being entrained with the exhaust gases and deteriorating the catalyst in the muffler.

Spherical gaskets are known which are made by winding a strip of composite material comprising at least one strip of knitted metal superposed on a flexible strip of refractory material, e.g. mica or graphite, with the winding being compressed axially. In the resulting gasket, the stitches of the knitted metal are interleaved in one another and the spaces therebetween are filled with the refractory material which is squeezed through the stitches of the knitting while being compressed. Such a gasket is very rigid, and in particular it has no axial elasticity. Exhaust manifold vibrations are thus fully transmitted to the exhaust line suspended beneath the car, and this runs the risk of increasing the level of unwanted sound inside the vehicle cabin and of giving rise to a loss of sealing between the manifold and the exhaust pipe due to relative displacements.

An aim of the present invention is to provide a gasket having sufficient toughness to absorb a portion of the vibrations transmitted to the exhaust line while maintaining good sealing under all circumstances. In order to achieve this aim, the present invention provides a method of manufacturing a high temperature composite gasket comprising the steps of forming a strip of composite material comprising at least one flexible strip of refractory material superposed on at least one strip of knitted metal, of making a blank by winding the strip of composite material into a loop comprising at least one turn, and in compressing the loop in the axial direction thereof, wherein the flexible strip of refractory material includes at least one strip segment of non-woven fibers occupying at least one turn of the winding, and at least one segment of non-fibrous refractory material forming at least one turn of the loop.

An annular gasket is thus obtained comprising knitted metal having a refractory material imprisoned therein, which refractory material comprises, in section, a fibrous portion which is at least partially surrounded by a non-fibrous portion. It has been observed that the knitted metal provides elasticity to the overall structure, while the fibrous portion of the refractory material provides the toughness that enables it to absorb vibration by dry friction between fibers, and that the portion of the gasket containing the non-fibrous portion of the refractory material provides cohesion to the composite gasket. Further, for a gasket which includes a sliding face, the non-fibrous portion of the refractory material preferably extends over said face and the material is selected to improve the sliding of the gasket over the complementary surface, which may be spherical, for example.

In an advantageous version of the invention, the strip of composite material includes a strip segment of non-woven fibers lying between two segments of non-fibrous refractory material. Thus, while it is being wound, the fibrous refractory material is clamped between strip segments made of non-fibrous refractory materials, and after compression the non-fibrous portion of the refractory material completely surrounds the fibrous portion of refractory material.

Preferably, the segments of non-fibrous refractory material are wider than the segment of non-woven fibers. Thus, a sufficient quantity of non-fibrous material is certain to be available in the vicinity of the ends of the winding in an axial direction thereof to ensure that the non-fibrous material spreads completely over the end of the portion of fibrous refractory material.

Other characteristics and advantages of the invention appear from reading the following description of a particular embodiment with reference to the accompanying figures, in which.

Figure 1:
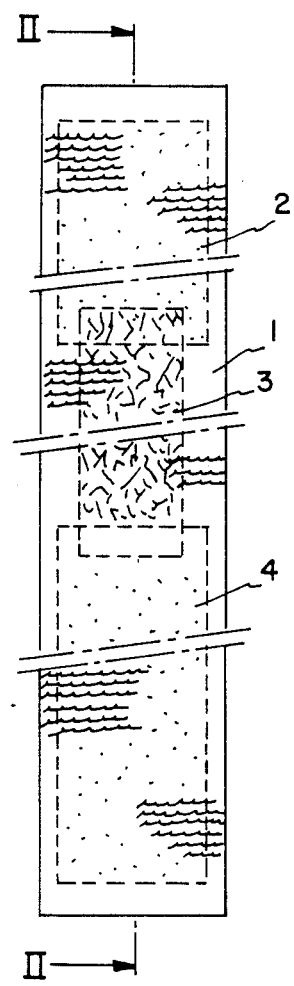
FIG. 1 is a plan view of a strip of composite material used for manufacturing a gasket in accordance with the invention.
Figure 2:
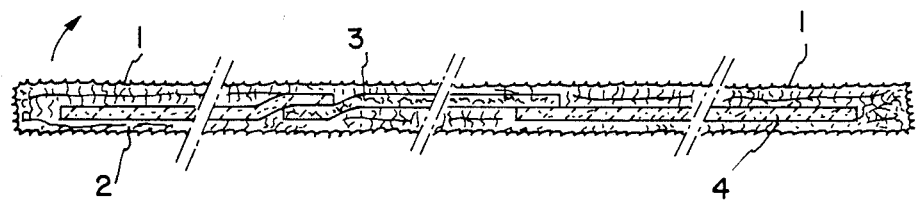
FIG. 2 is a section view on line II—II of FIG. 1.

With reference to FIGS. 1 and 2, the method of manufacturing a high temperature composite gasket is implemented, in accordance with the invention, by initially providing a strip of composite material comprising at least one flexible strip of refractory material and at least one superposed strip of knitted metal. In the preferred embodiment shown, the knitted metal is in the form of a sock 1 into which a strip segment of non-fibrous refractory material 2 is inserted, e.g. a segment of graphite strip. A second segment is then inserted in the sock 1, this time in the form of a strip of non-woven fibrous refractory material 3, and its end is slid under the strip of non-fibrous refractory material 2.

The strip of refractory material comprising non-woven fibers 3 is preferably a segment from a sheet of alumina-silicate.

Finally, a segment of non-fibrous refractory material 4 is inserted into the sock 1 with one end thereof being slid under the opposite end of strip segment 3 to the end adjacent strip segment 2.

It may be observed in FIG. 1 that the strip segments of non-fibrous refractory material 2 and 4 are preferably wider than the segment of non-woven fibers 3, and that the strip segments overlap partially. It may also be observed that it is not necessary for the ends of the knitted metal sock 1 to coincide exactly with the ends of the strip segments of refractory material.

Figure 3:
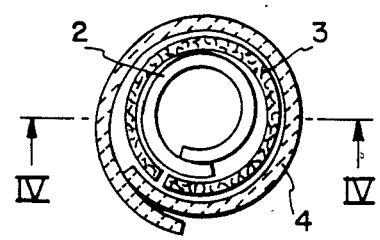
FIG. 3 is a diagrammatic section of a winding obtained from the strip of composite material in accordance with the invention.
Figure 4:
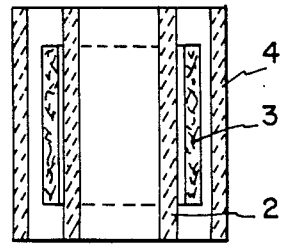
FIG. 4 is a diagrammatic section on line IV—IV of FIG. 3.

The strip of composite material is wound to form a loop (optionally around a core, not shown) and a blank is thus obtained as shown in FIGS. 3 and 4. In order to clarify these figures, the layers of knitted metal 1 are not shown. It can be seen in FIG. 3, that each of the strip segments occupies at least one turn of the winding.

Figure 5:
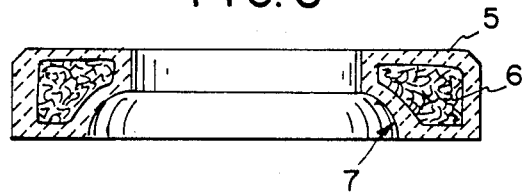
FIG. 5 is a section view through a gasket obtained by the method in accordance with the invention.

The blank is then compressed axially in a manner known per se in order to obtain a high temperature composite gasket which is shown diagrammatically in section in FIG. 5. In order to facilitate understanding, the metal wires are not shown in FIG. 5 which is intended solely to show the distribution of the refractory materials. It can be seen in FIG. 5 that the non-fibrous portion 6 of refractory material completely surrounds the fibrous portion 6 of refractory material.

FIG. 5 illustrates another aspect of the invention. In existing structures, the gaskets have convex surfaces which co-operate with concave surfaces on exhaust manifolds, with the gaskets preferably having volumes which are as small as possible. In contrast, in accordance with the invention, it is desirable to provide a gasket containing as much energy-absorbing material as possible, so as to attenuate vibrations transmitted to the exhaust line as much as is compatible with the limited volume available. In order to do this, a gasket is provided, in accordance with the invention, comprising a face 7 which has a concave profile and which is preferably centered on the axis of the gasket. It has been observed that for a given axial length of gasket, this provides for a larger volume of material. The concave surface of the gasket then co-operates with a convex surface provided on the exhaust manifold or on the exhaust pipe in order to constitute a spherical joint.

Figure 6:
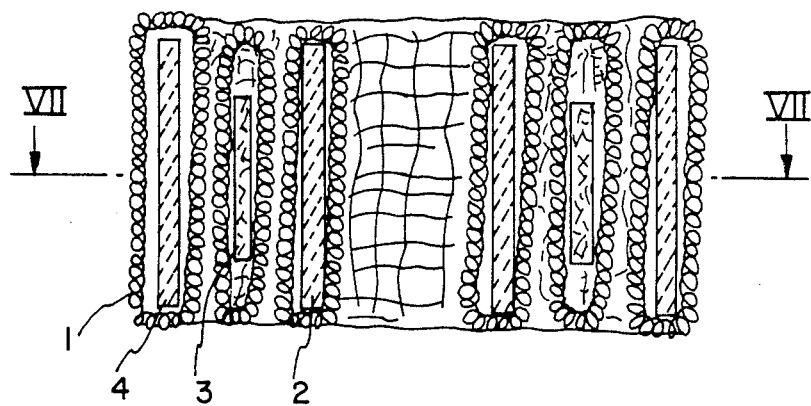
FIG. 6 is an enlarged section view of the embodiment illustrated by FIG. 4 incorporating layers of metal knitted sock.
Figure 7:
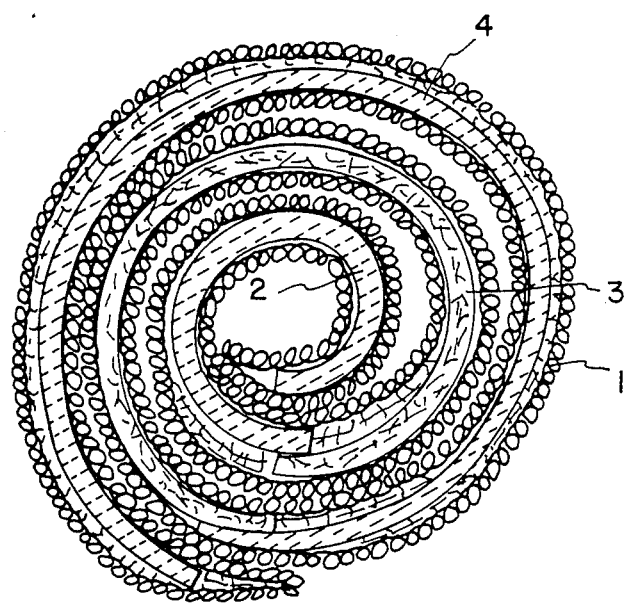
FIG. 7 is an enlarged section view on line VII—VII in FIG. 6.

FIG. 6 illustrates an enlarged section view of the embodiment shown in FIG. 4 with the winding assembly of the non-fibrous refractory material 2, 4 and the non-woven fibers segment 3 within the knitted metal sock 1. Further, FIG. 7 shows FIG. 6 in a cross-sectional view along line VII—VII.

Naturally, the invention is not limited to the embodiment described and variants which occur to the person skilled in the art may be applied thereto. In particular, for reasons of simplicity in insertion into the knitted metal sock, the segments may be disposed end-to-end therein, or they may even be spaced apart slightly from one another. Further, if the gasket is to be used so that it is clamped in a housing, it is not necessary to provide non-fibrous refractory material facing the portion which is clamped in the housing and a configuration of the strip of composite material different from that shown may be adopted, for example the segment 2 or the segment 4 may be omitted so that after compression the fibrous of refractory material is only partially surrounded by a non-fibrous portion, for example on the side facing the spherical portion of the gasket in order to ensure low friction thereon.

I claim:

1. A method of manufacturing an annular resilient high temperature composite gasket comprising the steps of forming a strip of composite material comprising at least one flexible strip of refractory material superposed on at least one strip of knitted metal, making a blank by winding the strip of composite material into a winding comprising at least one turn, the flexible strip of refractory material including at least one strip segment comprised of refractory fibers formed into a non-woven material with said non-woven material occupying at least one turn of the winding, and at least one strip segment of non-fibrous refractory material forming at least one turn of the winding, and compressing the winding in an axial direction thereof so as to form an annular gasket wherein, in axial cross section, said flexible strip of refractory material forms a fibrous refractory portion which is at least partially surrounded by a non-fibrous refractory portion and the winding is compressed to a degree sufficient to enable dry frictional movement between fibers of the fibrous refractory portion while the knitted metal remains resilient and at least partially surrounds the refractory portions.

2. A method according to claim 1, wherein the refractory material constituting the non-woven fibers is alumina-silicate.

3. A method according to claim 1, wherein the strip segments overlap one another at least partially.

4. A method according to claim 1, wherein the strip of composite material includes a strip segment of non-woven fibers lying between two strip segments of non-fibrous refractory material.

5. A method according to claim 4, wherein the strip segments of non-fibrous refractory material are wider in transverse dimension than the strip segment of non-woven fibers.

* * * * *